(No Model.)
G. W. SCHENCK.
Thrashing Machine.
No. 236,182. Patented Jan. 4, 1881.
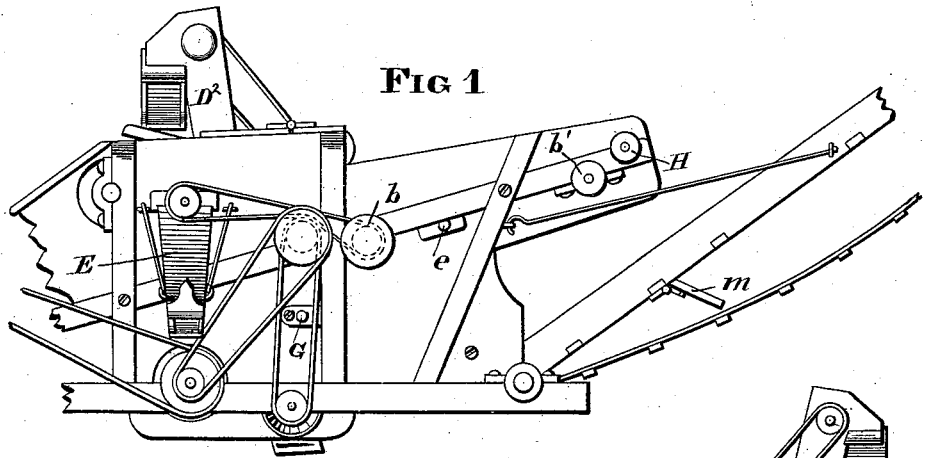
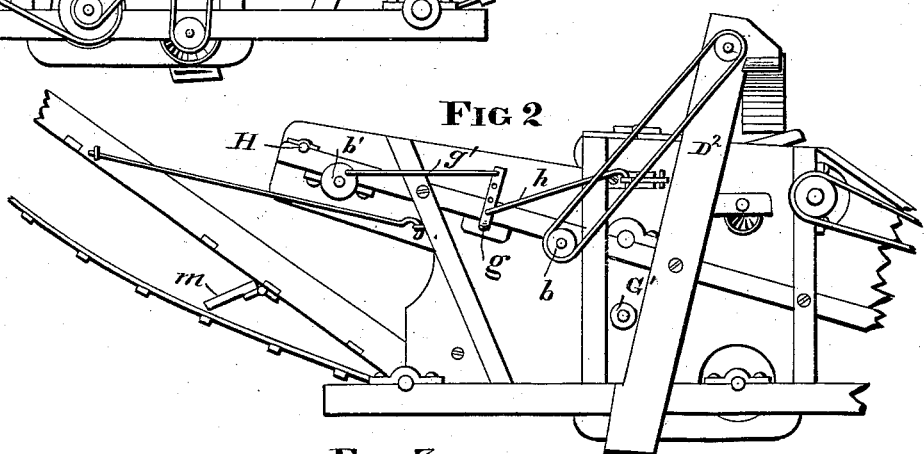
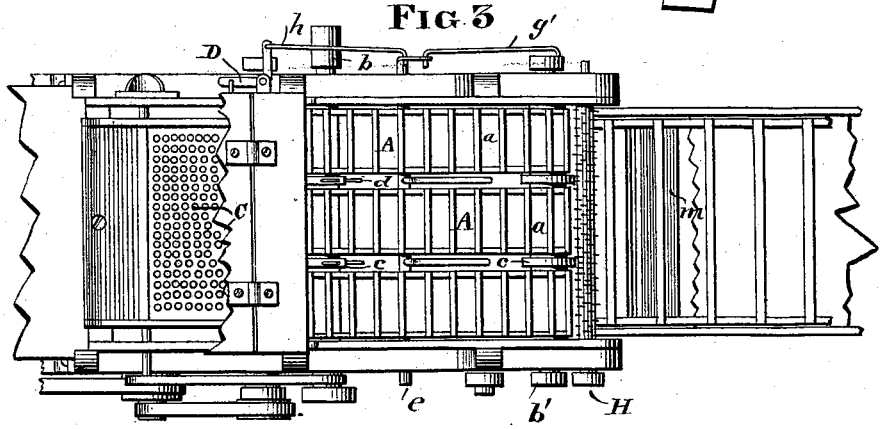
WITNESSES
Wilmer Bradford
Edward McClain
INVENTOR
George W Schenck
By C Wm Smith
Attorney

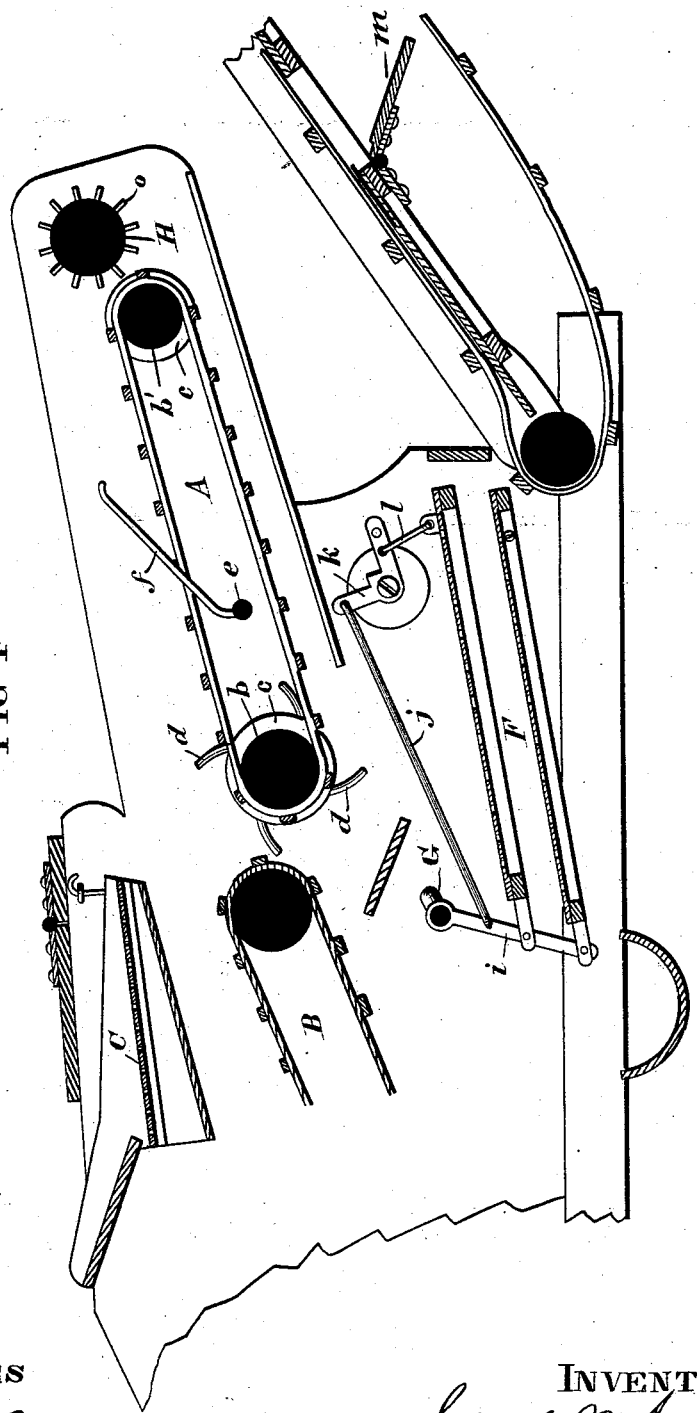

UNITED STATES PATENT OFFICE.

GEORGE W. SCHENCK, OF SAN FRANCISCO, CALIFORNIA.

THRASHING-MACHINE.

SPECIFICATION forming part of Letters Patent No. 236,182, dated January 4, 1881.

Application filed June 9, 1880. (No model.)

*To all whom it may concern:*

Be it known that I, GEORGE W. SCHENCK, of San Francisco, in the county of San Francisco and State of California, have invented certain new and useful Improvements in Thrashing-Machines, of which the following is a specification.

My invention relates to an improved construction of the straw-rake which receives the straw from the draper, and to a means of lifting and picking the straw and separating the grains therefrom in its passage along the rake to the stacker; also, to certain other details of construction, as hereinafter more fully described and claimed.

Figure 1 is a side elevation of a portion of a thrashing-machine embodying my improvements. Fig. 2 is an elevation of the opposite side of the same. Fig. 3 is a top view, and Fig. 4, Sheet 2, is a sectional view.

I construct the rake A in sections $a$, as shown. These sections are mounted on rollers $b\ b'$, provided with collars $c\ c$, which permit each section or separate apron to move in independent guides. The collars of the lower rollers are provided with curved teeth $d$, the office of which is to engage the straw as it comes from the draper B and draw it up and upon the rakes and separate the straw and prevent it from matting.

Transversely across the machine, between the sectional rakes, I place a rock-shaft, $e$, having upwardly-projecting curved fingers or beaters, $f$, which operate in the spaces between the sectional rakes and lift up and shake the straw and separate the thrashed grain before it passes over the upper end of the rakes onto the stacker. The rock-shaft has a crank-arm, $g$, to which is hooked the rod $g'$, the opposite end being eccentrically fixed to the front driving-roller, $b'$.

To the end of the machine, in front of the rakes, I attach a roller, H, provided with radial pins or arms $o$. These pins or arms act as pickers to pick the straw and further separate any particles of grain which may remain in the straw coming from the rakes and permit it to fall onto the screen beneath.

A sieve or screen, C, is placed at the top of the machine, as shown, upon which the grain, as it comes from the well, by means of the elevator, $D^2$, is distributed, which finally separates any remaining chaff, cheat, or foreign seeds, and delivers the grain into the trough E and out to the sack. This screen is operated by a bell-crank, D, and connecting-rods $g'\ h$, the latter connecting one arm of the bell-crank to the crank-arm of the rock-shaft D', which operates the lifting-fingers $f$, whereby a horizontal reciprocating movement is imparted to the screen by the forward and backward action of the said crank-arm.

The inner end of the screen F is connected by hangers $i$ to the double-crank shaft G, which is driven by the pulley G'. From the hangers extend connecting-rods $j\ j$, which connect with the bell-cranks $k$ at the sides of the machine, and links $l\ l$ connect the bell-cranks with the screen near the forward end thereof, and thus a slightly vertical or upward motion, as well as a horizontal reciprocal motion, is imparted to the screen in its operation.

It is oftentimes desirable to consume the straw for fuel in thrashing in the field; and to do this successfully the lumps of dirt and other foreign substances should be separated from the straw before being placed in the furnace. I accomplish this object by constructing a hinged door, $m$, in the stacker, over which the straw passes, and this door permits the heavier substances to pass through upon the ground, while the straw is carried up and off over the end of the stacker.

Having thus described my invention, what I claim, and desire to secure by Letters Patent, is—

1. In a thrashing-machine, the sectional rakes A, mounted on driving-rollers $b\ b'$, the inner one, $b$, having curved teeth $d$, and provided with the lifting and shaking fingers $f$, operating in spaces between the sections of the rakes by means of the rock-shaft $e$, crank-arm $g$, and rod $g'$, in combination with the draper B and roller H, having radial pins $o$, substantially as and for the purpose specified.

2. In a thrashing-machine, the combination, with the screens F, of the double-crank shaft G, rods $j\ j$, bell-cranks $k\ k$, and links $l\ l$, substantially as and for the purpose set forth.

In testimony that I claim the foregoing I have hereunto set my hand and seal this 18th day of May, 1880.

GEORGE W. SCHENCK. [L. S.]

Witnesses:
C. W. M. SMITH,
W. P. COLEMAN.